United States Patent
Yasunaka et al.

(10) Patent No.: US 10,304,484 B2
(45) Date of Patent: May 28, 2019

(54) SERVO WRITE CONTROL APPARATUS AND METHOD, AND MAGNETIC DISK APPARATUS

(71) Applicant: Kabushiki Kaisha Toshiba, Tokyo (JP)

(72) Inventors: Shigen Yasunaka, Kanagawa (JP); Shinji Takakura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 423 days.

(21) Appl. No.: 15/066,343

(22) Filed: Mar. 10, 2016

(65) Prior Publication Data

US 2016/0275977 A1  Sep. 22, 2016

(30) Foreign Application Priority Data

Mar. 20, 2015 (JP) .................................. 2015-058372

(51) Int. Cl.
G11B 5/596 (2006.01)

(52) U.S. Cl.
CPC ...... G11B 5/59655 (2013.01); G11B 5/59666 (2013.01); G11B 5/59672 (2013.01)

(58) Field of Classification Search
CPC ....... G11B 5/012; G11B 5/02; G11B 5/59633; G11B 5/5965–5/59672; G11B 5/59688; G11B 5/5543
USPC ....... 360/55, 75, 77.01–77.08, 31, 48, 78.14
See application file for complete search history.

(56) References Cited

U.S. PATENT DOCUMENTS

| | | | |
|---|---|---|---|
| 5,581,420 A | 12/1996 | Chainer et al. | |
| 5,867,337 A | 2/1999 | Shimomura | |
| 6,317,285 B1 * | 11/2001 | Bi ....................... | G11B 5/59644 360/75 |
| 6,603,627 B1 | 8/2003 | Chainer et al. | |
| 6,650,491 B2 * | 11/2003 | Suzuki ................... | G11B 5/012 360/31 |
| 7,019,933 B2 * | 3/2006 | Iseri .................... | G11B 5/59633 360/75 |
| 7,102,840 B2 * | 9/2006 | Sado ................... | G11B 5/59666 360/48 |
| 7,133,237 B2 * | 11/2006 | Ikeda ................. | G11B 5/59666 360/75 |

(Continued)

FOREIGN PATENT DOCUMENTS

| | | |
|---|---|---|
| JP | 8-255448 | 10/1996 |
| JP | 2000-322848 | 11/2000 |

(Continued)

*Primary Examiner* — Nabil Z Hindi
(74) *Attorney, Agent, or Firm* — Finnegan, Henderson, Farabow, Garrett & Dunner, L.L.P.

(57) ABSTRACT

According to one embodiment, a servo write control apparatus is for a disk apparatus including a read element and a write element located in an outer side of a disk from the read element. The servo write control apparatus detects a plurality of first burst signals recorded in a circumferential direction of the disk by the read element. The servo write control apparatus calculates an offset in a radial direction when the write element writes a second burst signal, based on amplitude values of at least two of the first burst signals used for positioning the read element. The servo write control apparatus adjusts a write position of the second burst signal based on the offset.

13 Claims, 7 Drawing Sheets

(56) References Cited

U.S. PATENT DOCUMENTS

| | | | |
|---|---|---|---|
| 7,342,735 B2* | 3/2008 | Hashimoto | G11B 5/59666 360/75 |
| 7,489,463 B2* | 2/2009 | Hashimoto | G11B 5/59666 360/75 |
| 7,567,406 B2* | 7/2009 | Ohzeki | G11B 5/59644 360/75 |
| 7,573,669 B2* | 8/2009 | Saikawa | G11B 5/59666 360/75 |
| 8,023,220 B2* | 9/2011 | Yoshioka | G11B 5/59672 360/77.07 |
| 2002/0196576 A1 | 12/2002 | Hirano et al. | |
| 2003/0043494 A1 | 3/2003 | Yasuna et al. | |
| 2003/0218821 A1 | 11/2003 | Sado | |
| 2004/0057151 A1 | 3/2004 | Saikawa et al. | |
| 2004/0201914 A1 | 10/2004 | Ikeda et al. | |
| 2005/0052767 A1 | 3/2005 | Miyata et al. | |
| 2005/0068662 A1 | 3/2005 | Sado | |
| 2005/0073771 A1 | 4/2005 | Shimomura et al. | |
| 2005/0078403 A1 | 4/2005 | Mizukoshi | |
| 2005/0094307 A1 | 5/2005 | Iwashiro | |
| 2007/0247742 A1 | 10/2007 | Saikawa et al. | |
| 2007/0253095 A1 | 11/2007 | Washizu et al. | |
| 2008/0030890 A1 | 2/2008 | Ohzeki et al. | |
| 2008/0151413 A1 | 6/2008 | Mizukoshi et al. | |
| 2008/0158717 A1 | 7/2008 | Sasamoto | |
| 2010/0123972 A1 | 5/2010 | Higashino | |
| 2010/0177432 A1 | 7/2010 | Higashino | |
| 2011/0063751 A1 | 3/2011 | Yasuna et al. | |
| 2011/0072644 A1 | 3/2011 | Katsumura et al. | |

FOREIGN PATENT DOCUMENTS

| | | |
|---|---|---|
| JP | 2001-14816 | 1/2001 |
| JP | 2002-8331 A | 1/2002 |
| JP | 2003-7012 | 1/2003 |
| JP | 2003-68037 | 3/2003 |
| JP | 2003-141835 | 5/2003 |
| JP | 2003-338147 | 11/2003 |
| JP | 2004-030778 | 1/2004 |
| JP | 2004-158085 | 6/2004 |
| JP | 2004-288342 | 10/2004 |
| JP | 2004-303325 | 10/2004 |
| JP | 2005-078702 | 3/2005 |
| JP | 2005-100611 | 4/2005 |
| JP | 2005-108296 | 4/2005 |
| JP | 2005-116096 | 4/2005 |
| JP | 2005-135530 | 5/2005 |
| JP | 2006-344265 | 12/2006 |
| JP | 2007-287284 | 11/2007 |
| JP | 2007-294050 | 11/2007 |
| JP | 2008-27524 | 2/2008 |
| JP | 2008-033993 | 2/2008 |
| JP | 2008-159222 | 7/2008 |
| JP | 2008-165918 | 7/2008 |
| JP | 2008-210483 | 9/2008 |
| JP | 2010-49742 A | 3/2010 |
| JP | 2010-123168 | 6/2010 |
| JP | 2010-140537 | 6/2010 |
| JP | 2010-165413 | 7/2010 |

* cited by examiner

SERVO WRITE CONTROL APPARATUS AND METHOD, AND MAGNETIC DISK APPARATUS

CROSS-REFERENCE TO RELATED APPLICATIONS

This application is based upon and claims the benefit of priority from Japanese Patent Application No. 2015-058372, filed Mar. 20, 2015, the entire contents of which are incorporated herein by reference.

FIELD

Embodiments described herein relate generally to a servo write control apparatus and method, and a magnetic disk apparatus.

BACKGROUND

In a servo write process in a magnetic disk apparatus, self-servo write is proposed, which means that the magnetic disk apparatus itself records servo information, such as a burst signal, in a blank medium without using a dedicated servo write apparatus. Self-servo write enables cost reductions in the servo write process.

In the self servo write, a head having a read element and a write element located at different positions is used. In the case of using such a head, a pitch between burst signal recording positions varies because of a change in a read and write offset representing a distance between a read element and a write element by a skew angle, a change in write width in a radial direction, and a deviation of an offset in a writing time. Therefore, to record high-quality servo information, it is necessary to accurately control the pitch between burst signal recording positions.

Conventionally, a technique of representing a track pitch by a multiple regression model, obtaining a correction amount of an offset, and correcting a pattern pitch is known. Also, a technique of checking a ratio between the write element width and the read element width, and determining a read and write offset from the ratio and a signal ratio with a burst signal is known.

BRIEF DESCRIPTION OF THE DRAWINGS

FIG. 5B is a diagram showing examples of processing in a burst signal writing time in a controller.

DETAILED DESCRIPTION

To produce a multiple regression model, a great amount of data is required. Moreover, if the design is changed, it is necessary to prepare a new model. In addition, to check a ratio between a write element width and a read element width, a process for obtaining a head width takes time. Furthermore, it is necessary to measure, in advance, a target value relating to an amplitude ratio to determine a track pitch by utilizing an external device, such as a rotary positioner.

In general, according to one embodiment, a servo write control apparatus is for a disk apparatus including a read element and a write element located in an outer side of a disk from the read element. The servo write control apparatus detects a plurality of first burst signals recorded in a circumferential direction of the disk by the read element. The servo write control apparatus calculates an offset in a radial direction when the write element writes a second burst signal, based on amplitude values of at least two of the first burst signals used for positioning the read element. The servo write control apparatus adjusts a write position of the second burst signal based on the offset.

Hereinafter, a servo write control apparatus and method, and a magnetic disk apparatus of the embodiment will be described in details with reference to the drawings. In the following embodiments, elements which perform the same operation will be assigned the same reference symbol, and redundant explanations thereof will be omitted as appropriate.

Figure 1:
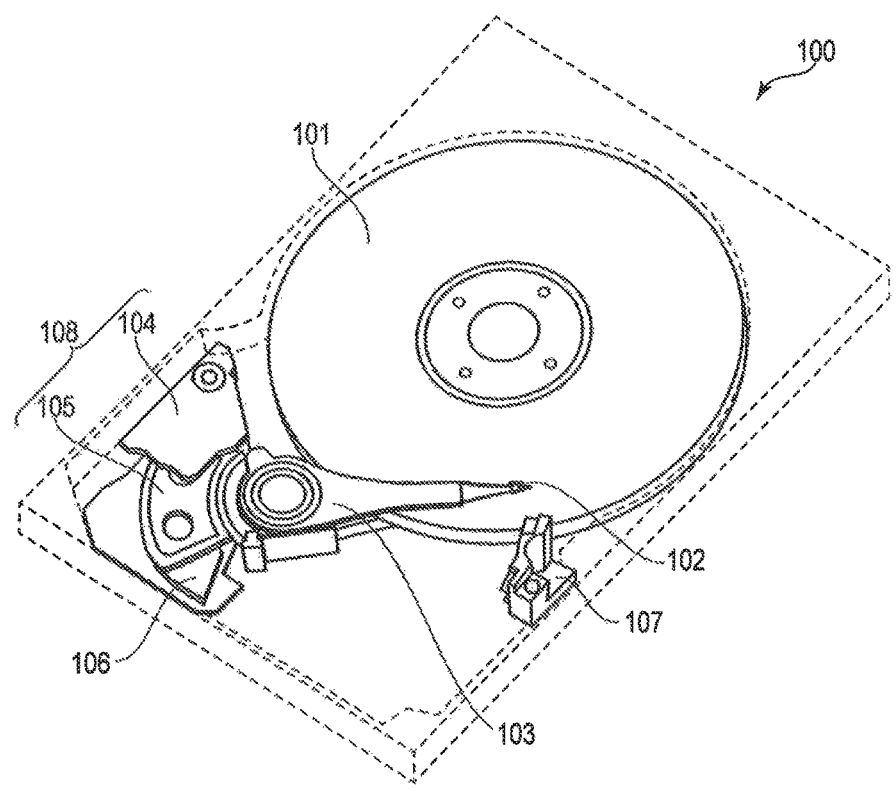
FIG. 1 is a schematic diagram showing a magnetic apparatus which performs a servo write process.

A schematic diagram showing a magnetic apparatus which performs a servo write process according to the embodiment will be described with reference to FIG. 1.

A magnetic disk apparatus 100 includes a disk 101, a head 102, an arm 103, a magnet 104, a coil 105, a stopper 106 and a ramp mechanism 107.

Combination of the magnet 104 and the coil 105 is also called a VCM (Voice Coil Motor) 108.

The disk 101 is a magnetic recording medium, in which servo information including a burst signal and data are written. In the embodiment, the disk 101 is assumed to be a blank medium to perform a self servo write process. The burst signal is used for a control in a case where a head is located in a track.

The head 102 includes a read element which reads servo information and data from the disk 101 and a write element which writes servo information and data in the disk 101. A configuration of the head 102 will be described later with reference to FIG. 5.

The arm 103 is a mechanism which is moved by the VCM 108 in a radial direction (also called a track direction) of the disk 101 to position the head 102 on the disk 101.

The VCM 108 is a mechanism which moves the arm 103 in accordance with a control signal (such as a current value or a voltage value).

The stopper 106 is a mechanism which controls a rotation angle of the arm.

The ramp mechanism 107 is a place where the head 102 is retreated from the disk 101.

Figure 2:
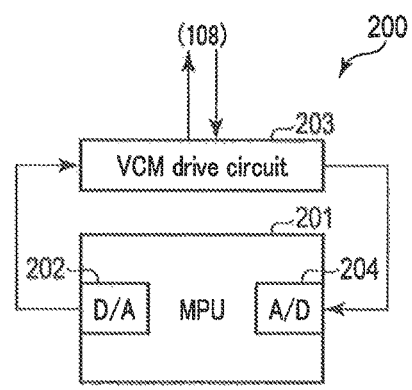
FIG. 2 is a diagram showing a drive system which drives a voice coil motor (VCM).

A drive system which drives the VCM 108 is shown in FIG. 2.

The drive system 200 includes a microprocessor (MPU) 201, a digital-analog (DA) converter 202, a VCM drive circuit 203 and an analog-digital (AD) converter 204. The drive system 200 may be included in the magnetic disk apparatus 100.

The MPU 201 generates a control signal to control the VCM. The control signal is a signal relating to for example, a current value or a voltage value. The MPU 201 receives a digital signal from the AD converter 204, to be detailed later, and performs feedback processing.

The DA converter 202 receives a control signal from the MPU 201, and converts the control signal, which is a digital signal, to an analog signal.

The VCM drive circuit 203 receives the analog signal from the DA converter 202 and controls an operation of the VCM 108. The VCM drive circuit 203 detects a drive amount of the VCM 108 and generates an analog signal relating to the drive amount.

The AD converter 204 receives the analog signal from the VCM drive circuit 203, and converts the analog signal to a digital signal.

Figure 3:
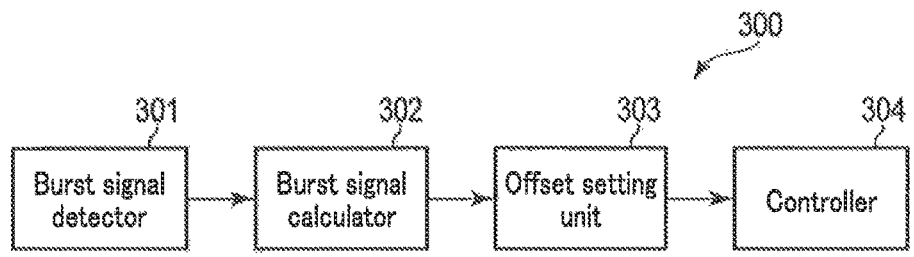
FIG. 3 is a block diagram showing a servo write control apparatus according to an embodiment.

Next, the servo write control apparatus according to the embodiment will be explained with reference to the block diagram of FIG. 3.

The servo write control apparatus 300 includes a burst signal detector 301, a burst signal calculator 302, an offset setting unit 303, and a controller 304.

The servo write control apparatus 300 may be contained, for example, in the MPU 201 shown in FIG. 2.

The burst signal detector 301 reads, by the read element, a plurality of burst signals which are prerecorded in an inner portion in a radial direction of a disk, and obtains the read burst signals and information relating to read positions. The burst signals are recorded contiguously in a circumferential direction of the disk.

The burst signal calculator 302 receives the information relating to the read positions and the burst signals read by the burst signal detector 301, and calculates amplitude values of at least two burst signals of the plurality of burst signals used for positioning the read element.

The offset setting unit 303 receives the amplitude values of the at least two burst signals from the burst signal calculator 302, and calculates and sets, based on the amplitude values, an offset in a radial direction of the disk for writing a new burst signal by the write element, which is located on an outer side from the read element in the radial direction of the disk.

The controller 304 receives the offset from the offset setting unit 303, and adjusts a write position of a new burst signal to be written by the write element based on the offset.

Figure 4:
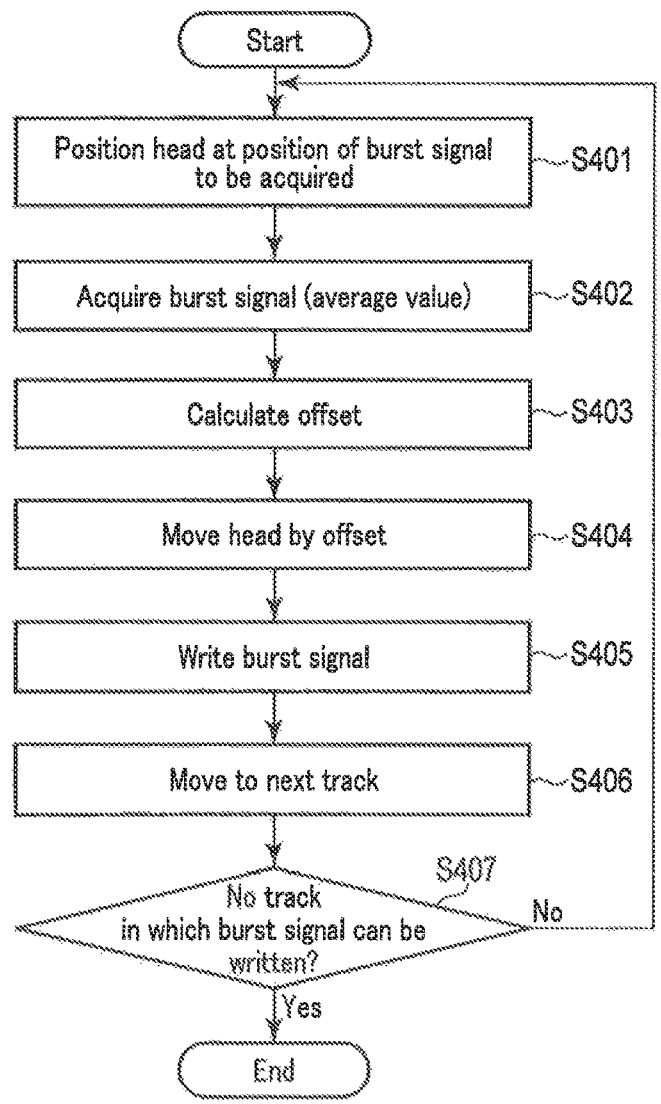
FIG. 4 is a flowchart showing an operation of the servo write control apparatus.

Next, the operation of the servo write control apparatus 300 will be described with reference to the flowchart shown in FIG. 4.

In step S401, the burst signal detector 301 positions the head 102 at a position of a burst signal to be acquired, and obtains the burst signal and information relating to a read position.

In step S402, the burst signal calculator 302 calculates an amplitude value of the burst signal. To improve the precision, it is preferable to use an average of amplitude values of a plurality of burst signals. For this purpose, the processing of steps S401 and S402 may be repeated a predetermined number of times.

In step S403, the offset setting unit 303 calculates an offset from the amplitude values of the burst signals.

In step S404, the controller 304 causes the arm to move via the VCM drive circuit 203 and the VCM 108, so as to move the head 102 according to the offset.

In step S405, the write element writes a new burst signal in the disk.

In step S406, the write element moves to a next track to write a next burst signal.

In step S407, the controller 304 determines whether or not there is a track in which a burst signal can be written. The determination of whether or not there is a track in which a burst signal can be written may be made by the controller 304 through a conventional determination process, for example, by acquiring position information of the head on the disk 101 to determine whether or not a burst signal can be written in the next track. If there is a track in which a burst signal can be written, the flow returns to step S401 and the processing is repeated. If there is no track in which a burst signal can be written, the processing is ended.

The head 102 and a concept of read and write offsets of this embodiment will be described with reference to FIG. 5.

Figure 5:
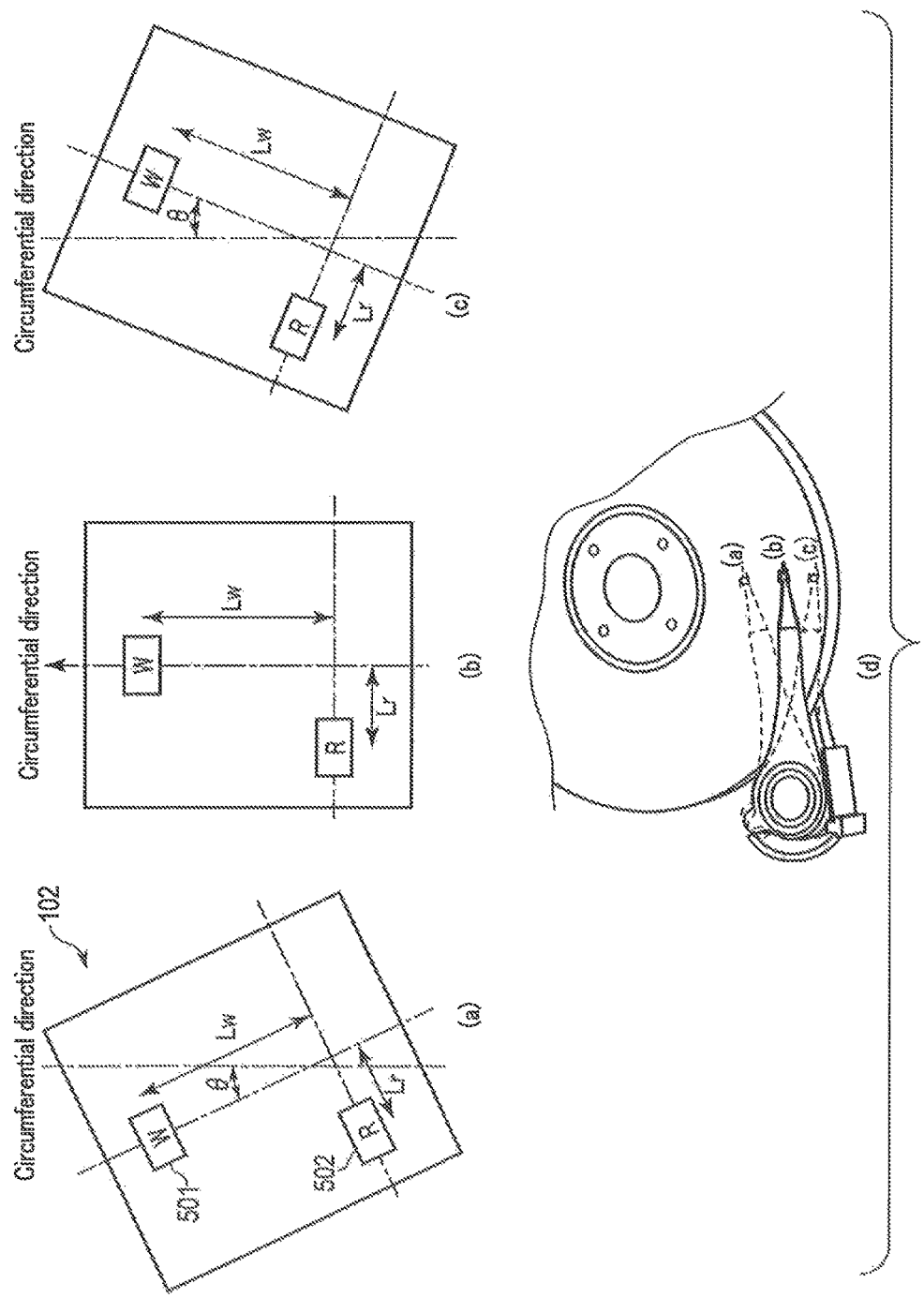
FIG. 5 is a diagram showing heads and a concept of read and write offsets.

As shown in FIG. 5, a write element 501 (W) and a read element 502 (R) included in the head 102 are located at positions different from each other in a circumferential direction and a radial direction. The head of this type is called an offset head. Due to the offset, the head is designed so that the read element 502 and the write element 501 are always located on an inner side and an outer side, respectively, when the head 102 is moved in a radial direction of the head 102. At this time, a read and write offset occurs in the radial direction because of a skew angle of the head.

As shown in FIG. 5, assuming that a distance of the read element 502 from a reference position is Lr, a distance of the write element 501 from the reference position is Lw, and a skew angle is θ, the read and write offset RWoffset is represented by the following equation: $RWoffset = Lr \cos\theta - Lw \sin\theta$.

Specifically, the read and write offset RWoffset varies in the cases where the head 102 is located at positions (a), (b), and (c) shown in FIG. 5.

Next, the relationship between a burst signal and a track pitch is explained with reference to FIG. 6.

In a self-servo write process in practice, absolute position information of the head cannot be obtained. Therefore, to adjust a pitch between burst signal recording positions, the recorded amplitudes of the burst signals used in positioning are utilized. In self servo write, the read element is positioned to a burst signal recorded in an inner side, and the write element writes a new burst signal in an outer side. The write process proceeds to an outer region in a radial direction of the track. The steps of positioning the read element to a burst signal recorded by the write element and writing a new burst signal in an outer portion are repeated. Finally, servo information, such as a burst signal, can be recorded in the overall region of the disk 101, which was a blank medium.

Figure 6:
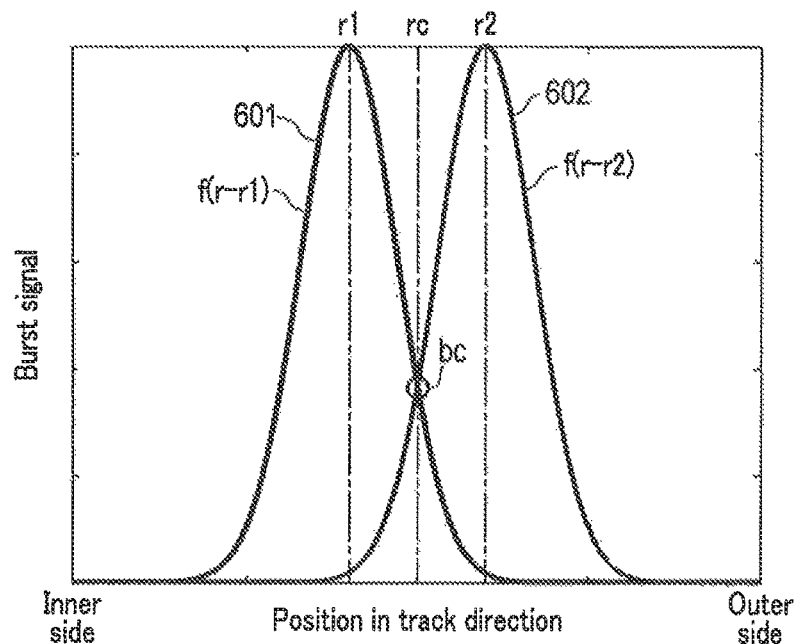
FIG. 6 is a diagram showing a relationship between a burst signal and a track pitch.

FIG. 6 shows waveforms of burst signals obtained when the burst signals are read in a radial direction. Assuming that the horizontal axis indicates a position in a radial direction and the vertical axis indicates an amplitude of a burst signal, the waveform is considered to be representing an even function, which is convex upward around a vertex at the center. In a very small range in which burst signals overlap (in a range of several track widths), variation of the skew angle is very small. Therefore, in FIG. 6, the waveform of a burst signal 601 centering on a position coordinate r1 may be regarded as the same function as that of the waveform of the burst signal 602 centering on a position coordinate r2.

With regard to a position coordinate rc in the radial direction, an intersection of the burst signal 601 and the burst signal 602, a formula (1) is established. Since r1 is smaller than r2 (r1<r2) and the waveforms represent even functions, the position coordinate rc is a midpoint between r1 and r2, as represented by a formula (2).

$$f(rc - r1) = f(rc - r2) \qquad (1)$$

$$rc = \frac{r1 + r2}{2} \qquad (2)$$

Therefore, an amplitude value be of the burst signal at the position coordinate re is represented by a formula (3) from r1 and r2.

$$bc = f\left(\frac{r2 - r1}{2}\right) \qquad (3)$$

A method for determining offsets in the burst signal calculator 302 and the offset setting unit 303 will now be described with reference to FIG. 7.

Figure 7:
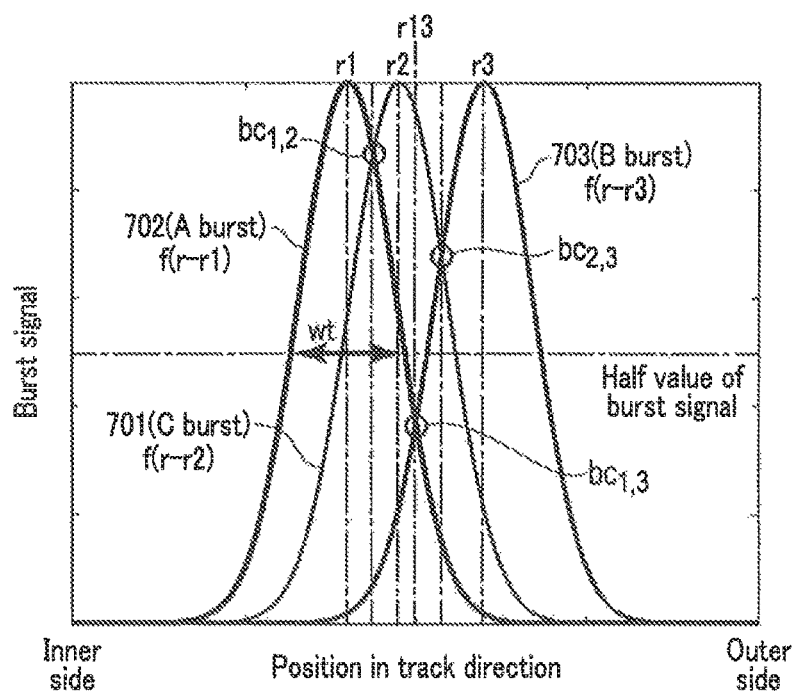
FIG. 7 is a diagram showing a method for determining offsets in a burst signal calculator and an offset setting unit.

As well as FIG. 6, FIG. 7 shows waveforms of burst signals obtained when the burst signals are read in a radial direction. For the convenience of explanation, the burst signals are referred to as A burst 702, C burst 701 and B burst 703 starting from an inner side.

When the head 102 is positioned, a center of the track is at a position coordinate (r13), where the amplitudes of the two bursts, the A burst 702 and the B burst 703 on both sides of the C burst 701, are the same, as shown in FIG. 7. The head stops at the center of the track, r13. The distance between a center r1 of the A burst 702 and a center r3 of the B burst 703 corresponds to a track pitch. The write width may be considered to be a half width wt of the waveform of a burst signal (a distance in the radial direction between points where the amplitude of the burst signal is half the maximum value).

A method for adjusting a distance between the center r1 of the A burst 702 and the center r3 of the B burst 703 will be described.

When the half width is represented by wt, the signal waveform at a position shifted from the center of a signal wave by wt/2 is a half value bh of a burst signal. The half value bh is represented by the formula (4).

$$bh = f\left(\frac{wt}{2}\right) \qquad (4)$$

The signal waveform at an intersection between A burst 702 and B burst 703 is expressed by the formula (5).

$$bc_{1,3} = f\left(\frac{r3 - r1}{2}\right) \qquad (5)$$

Therefore, if a signal value $bc_{1,3}$ at an intersection between the A burst 702 and the B burst 703 coincides with the half value bh of the burst signal, a distance (track pitch) between recording positions of burst signals, which are adjacent but separated by one, can coincide with the write width, as is expressed by the formula (6).

$$wt = r3 - r1 \qquad (6)$$

Specifically, with respect to the two burst signals, which are adjacent but separated by one in an adjacent direction, of all burst signals, that is, the A burst 702 and the B burst 703 on both sides of the C burst 701, the burst signal calculator 302 obtains amplitude values of the A burst 702 and the B burst 703 obtained when the read element is positioned at the center of the track (a midpoint of the track defined by the centers of the A burst 702 and the B burst 703 in the circumferential direction).

The offset setting unit 303 may set an offset which will make the signal value $bc_{1,3}$ of the intersection between the A burst and the B burst coincide with the half value bh of the burst signal based on the respective amplitude values of the A burst and the B burst.

The track pitch can be greater or smaller than the half width by setting the target value of $bc_{1,3}$ to bh×kb (0<kb<2).

Next, a method for making the center of the C burst 701 coincide with a position coordinate (rc13) of a midpoint between the center r1 of A burst 702 and the center r3 of B burst 703 will be described. The burst signal $bc_{1,2}$ at a position coordinate (rc12) where the C burst 701 coincides with the A burst 702 is represented by the formula (7).

$$bc_{1,2} = f\left(\frac{r2 - r1}{2}\right) \qquad (7)$$

The burst signal $bc_{2,3}$ at a position coordinate (rc23) where the A burst 702 coincides with the B burst 703 is represented by the formula (8).

$$bc_{2,3} = f\left(\frac{r3 - r2}{2}\right) \qquad (8)$$

Therefore, if the head 102 is adjusted to make $bc_{1,2}$ coincide with $bc_{2,3}$, the center r2 of the C burst 701 can coincide with the midpoint between the centers of the A burst 702 and the B burst 703. This is expressed by the formula (9), $$r2 = \frac{r3 + r1}{2} \qquad (9)$$

Thus, the burst signal calculator 302 may set an offset which will make the amplitude value at a position where the amplitude value of the A burst 702 coincides with that of the C burst 701 the same as the amplitude value at the position where the amplitude value of the C burst 701 coincides with that of the B burst 703.

A method for calculating an offset in pattern writing will now be described.

Explanations will be given below for the case in which the offset setting unit 303 performs integration processing for an amplitude value as an offset to adjust a pitch between burst signal recording positions.

An offset $u_n$ is an output of integration processing, which uses as an input a value obtained from the amplitude of a burst signal detected by positioning the head at the center of a track. The offset $u_n$ is expressed by the formula (10).

$$u_{n+2} = u_n + G_1(k_b bh - bc_{n+2,n}) \qquad (10)$$

The index n represents an ordinal number representing the ordinal position of the track where the read element is positioned, counted from the innermost track (n is a positive integer). G1 represents a gain.

The formula (10) expresses an offset which adjusts a pitch (track pitch) between burst signal recording positions, which are adjacent but separated by one. Therefore, it is necessary to calculate offsets respectively for odd numbered burst signals and even numbered burst signals. Those offsets are represented by the formulas (11) and (12).

$$u_{2n+2} = u_{2n} + G_{1even}(k_b bh - bc_{2n+2,2n}) \quad (11)$$

$$u_{2n+1} = u_{2n-1} + G_{1odd}(k_b bh - bc_{2n+1,2n-1}) \quad (12)$$

An odd numbered gain $G_{1even}$ and an even numbered gain $G_{1odd}$ may be the same or different.

The pitch between an odd numbered burst signal and an even numbered burst signal (the pitch between the A burst 702 and the C burst 701 in the example of FIG. 7) cannot be compensated for from the formulas (11) and (12) alone. Therefore, an offset which may satisfy the formula (9) is added to, for example, the formula (11) relating to the even numbered tracks, so that the formula (13) can be obtained.

$$u_{2n+2} = u_{2n} + G_{1even}(k_b bh - bc_{2n+2,2n}) + G_2(bc_{2n+1,2n+2} - bc_{2n+2,2n+3}) \quad (13)$$

The third term of the formula (13) is an output of an integrator, to which a value calculated from an amplitude of a burst signal obtained by positioning at a position where the A burst 702 coincides with the C burst 701 and an amplitude of a burst signal obtained by positioning at a position where the C burst 701 coincides with the B burst 703. G2 represents a gain.

The offset setting unit 303 can appropriately adjust the pitch between the burst signal recording positions by appropriately setting gains in the formulas (12) and (13). $K_b$ is not necessarily be a constant value but may be a variable.

Gains $G_1$ and $G_2$ may not always be constant values. In the method described above, amplitudes of burst signals need be acquired by positioning the head at the point where the amplitudes of the C burst 701, the A burst 702 and the B burst 703 shown in FIG. 7 coincide. Furthermore, to minimize influence of noise, it is necessary to average amplitudes of a plurality of burst signals. This process may further require time.

On the other hand, the skew angle changes slightly within a range of one track. Therefore, for example, an amount of correction may be determined by setting gains by calculating amplitude values of burst signals, for example, at every tens or hundreds of tracks and setting the gains to zero except for the case of calculating the amplitude values of the burst signals. Furthermore, the term of correcting a pitch between odd numbered tracks and the term for correcting a pitch between even numbered tracks (the term relating to the gain $G_1$ of the above formulas) are substantially the same. Therefore, the formulas (14) and (15) may be used by setting $G_1$ to zero when calculating the formula (13) for obtaining an offset of an even numbered track.

$$u_{2n} = u_{2n-1} + G_2(bc_{2n-1,2n} - bc_{2n,2n+1}) \quad (14)$$

$$u_{2n+1} = u_{2n-1} + G_1(k_b bh - bc_{2n+1,2n-1}) \quad (15)$$

If the track pitch is accurately adjusted, the half value bh of a burst signal can be half the amplitude of the burst signal. As a result, since a process for calculating an amplitude of a burst signal is not required, the self servo write time can be reduced.

Examples of processing in a burst signal writing time in the controller 304 will be described with reference to FIGS. 8A, 8B and 8C.

Figure 8A:
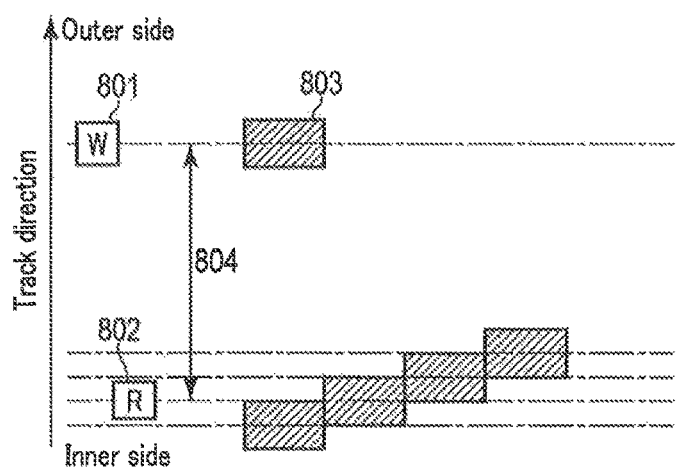
FIG. 8A is a diagram showing examples of processing in a burst signal writing time in a controller.
Figure 8B:
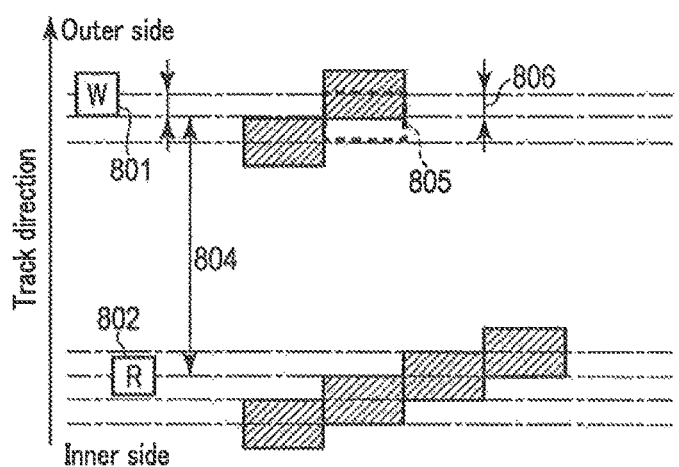
FIG. 8C is a diagram showing examples of processing in a burst signal writing time in a controller.
Figure 8C:
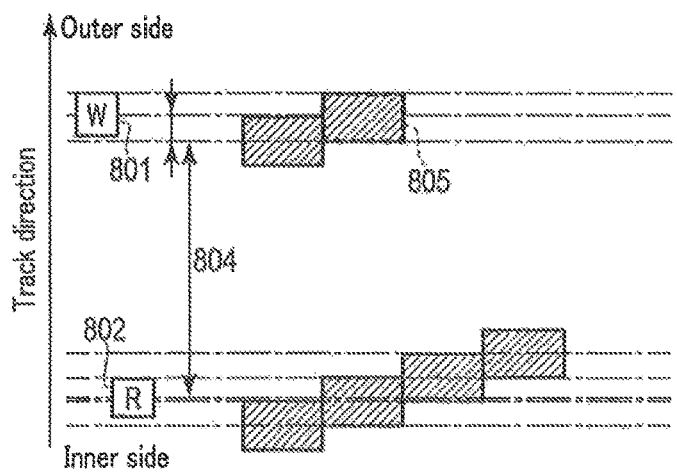

FIGS. 8A, 8B and 8C show examples, in which a burst signal already recorded in the disk 101 is read by a read element 802, while a new burst signal is written by a write element 801. The figure show burst signals which are read while the disk is rotating in a circumferential direction. A pitch 804 represents a read and write offset.

In FIGS. 8A, 8B and 8C, the vertical axis represents a position in a radial direction (track direction), and the horizontal axis represents time.

As shown in FIG. 8A, a new burst signal 803 has already been written by the write element 801.

Then, as shown in FIG. 8B, the write element 801 is to write a burst signal next to the burst signal 803. However, if the offset changes, the write position is shifted from a desired write position 805 by a distance corresponding to the shift amount 806.

To compensate for the shift, the controller 304 causes the read element to move by a distance corresponding to the offset, which is calculated by the offset setting unit 303 in the method described above. As a result, the write element 801 can write a burst signal at the desired write position 805. As shown in FIG. 8C, the read element may be moved to an inner side by the distance corresponding to the shift amount 806.

The frequency included in a burst signal in synchronism with a rotation can be reduced by calculating amplitude values of burst signals corresponding to a multiple of the number of sectors from a burst signal obtained when the head is positioned and averaging the amplitude values. Thus, the influence on the offset can be reduced.

Also, the read and write offset increases toward an outer side as compared to an inner side. Therefore, from the viewpoint of offset adjustment, the delay between writing and detection of the offset is longer in an outer side. To avoid the long delay, the read element is moved to a position where the last-written burst signal can be detected so that the amplitude of the last-written burst signal can be calculated. For example, because of a read and write offset, burst signals have already been recorded in, for example, several tracks in an outer side (assumed the number of tracks m, which a natural number). The offset may be calculated on the basis of the burst signals existing in an outer side in radial directions from the position of the read element. In the formula (14) and (15), the offset may be calculated by replacing "n" representing the position of the read element with "n+m".

After calculating the offset of the last-written burst signal, the read element may be returned to an inner side by the distance corresponding to the "m" tracks and the write element may write a burst signal at a position shifted by the offset. Thus, an optimal offset is applicable.

The gain of the controller may be set to a value normalized with an amplitude of a signal. The embodiment is applicable to a case in which the amplitude values of burst signals vary according to the head characteristics.

Simulation results of the servo write control apparatus of the embodiment will be described with reference to FIG. 9 to FIG. 11.

Figure 9:
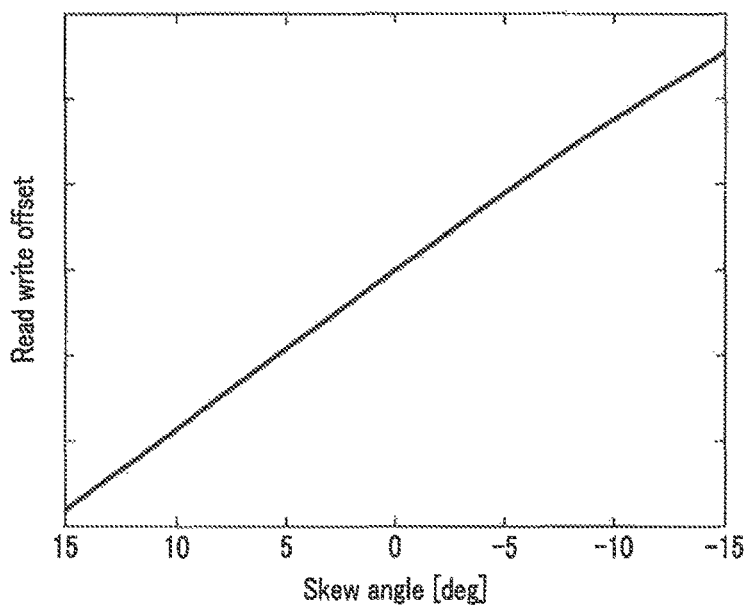
FIG. 9 is a diagram showing a read and write offset in a simulation.
Figure 10:
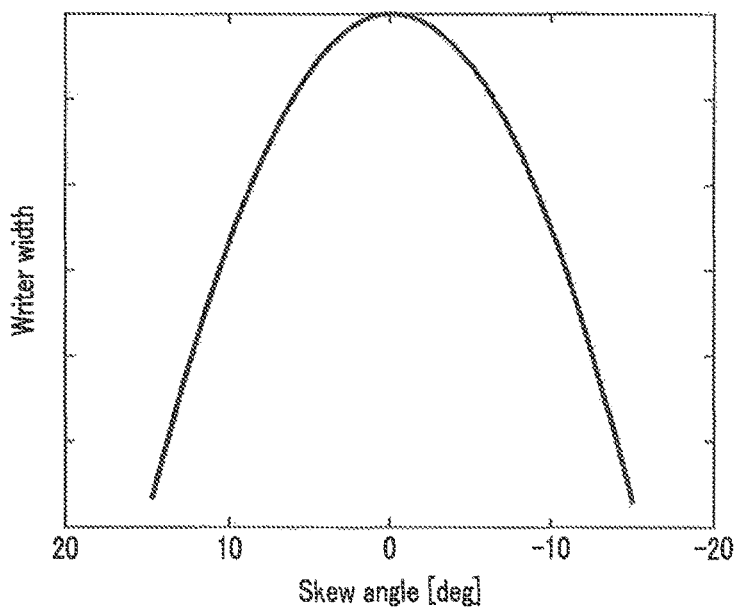
FIG. 10 is a diagram showing a write width in a simulation.

FIG. 9 shows a change of the read and write offset (track pitch) when the skew angle is changed ±15 degrees. FIG. 10 shows a change of the write width in a radial direction when the skew angle is changed ±15 degrees.

Figure 11:
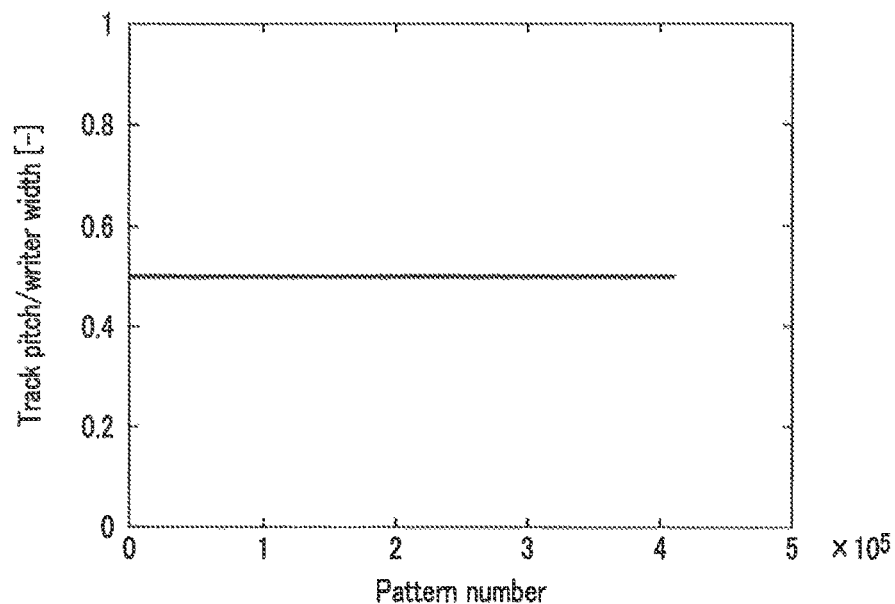
FIG. 11 is a diagram showing a ratio of a track pitch to a write width in a case where the offset is adjusted.

FIG. 11 shows an example in which the target value of $bc_{1,3}$ is set to bh (kb=1) and the offset is set such that the write width coincides with a pitch between burst signal recording positions (track width).

In FIG. 11, the vertical axis represents a ratio of the track pitch to the write width, and the horizontal axis represents a position in a radial direction where 0 indicates the innermost track of the disk. Since the pitch between the burst signal recording positions varies depending on the write width, the ratio of the track pitch to the write width is constant in FIG. 11.

In the embodiment described above, when the offset head performs self servo writing, the offset is calculated on the basis of amplitude values of a plurality of adjacent burst signals. Thus, the pitch between new burst signals written by the write element can be adjusted without the need for prior information about an apparatus which performs servo writing. Accordingly, the pitch between burst signal recording positions can be set to have a desired ratio to the write width.

Conventional Example

Figure 12:
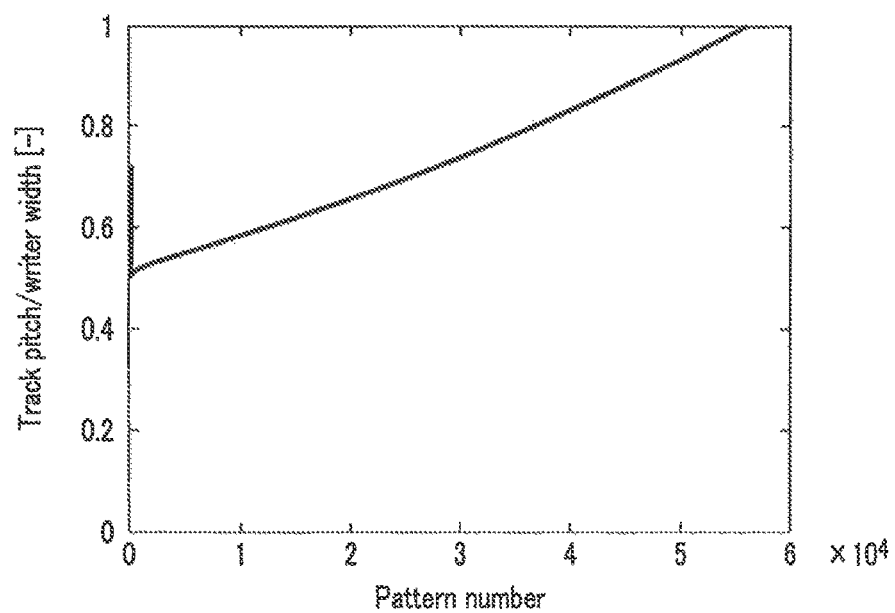
FIG. 12 is a diagram showing a ratio of a track pitch to a write width in a case where the offset is not adjusted.

FIG. 12 shows a ratio of a track pitch to a write width in a conventional example in which the offset is not adjusted, unlike the embodiment described above.

As evident from FIG. 12, the pitch between burst signal recording positions is longer and the accuracy of servo information written is lower in an outer side of the disk.

The flow charts of the embodiments illustrate methods and systems according to the embodiments. It is to be understood that the embodiments described herein can be implemented by hardware, circuitry, software, firmware, middleware, microcode, or any combination thereof. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A servo write control apparatus for a disk apparatus including a read element and a write element located in an outer side of a disk from the read element, the servo write control apparatus configured to:
    detect a plurality of first burst signals recorded in a circumferential direction of the disk by the read element;
    calculate an offset in a radial direction when the write element writes a second burst signal, based on amplitude values of two of the first burst signals used for positioning the read element;
    adjust the offset based on amplitude values of two third burst signals recorded on both sides of one of the first burst signals, the amplitude values of the two third burst signals being acquired when the read element is positioned at a middle portion of a track defined by centers of the two third burst signals in a circumferential direction; and
    adjust a write position of the second burst signal based on the offset.

2. The apparatus according to claim 1, wherein the apparatus adjusts the offset according to a position of the read element in a radial direction of the disk.

3. The apparatus according to claim 1, wherein the apparatus adjusts the offset so that a first value is equal to a second value, the first value of one of the amplitude values of the two of the third burst signals coinciding with an amplitude of a fourth burst signal recorded between the two of the third burst signals, the second value of another of the amplitude values of the two of the third burst signals coinciding with the amplitude of the fourth burst signal.

4. The apparatus according to claim 1, wherein the apparatus uses an average of the amplitude values of the plurality of first burst signals corresponding in number to a multiple of sectors of the disk.

5. The apparatus according to claim 1, wherein the apparatus detects, as a new first burst signal, one of the two of the third burst signals that is recorded by the write element in an outer side in the radial direction from the read element.

6. The apparatus according to claim 1, wherein the apparatus sets, as the offset, a value obtained by performing integral processing on amplitude values of the two of the third burst signals.

7. A servo write control method for a disk apparatus including a read element and a write element located in an outer side of a disk from the read element, wherein the method comprising:
    detecting a plurality of first burst signals recorded in a circumferential direction of the disk by the read element;
    calculating an offset in a radial direction when the write element writes a second burst signal, based on amplitude values of two of the first burst signals used for positioning the read element;
    adjusting the offset based on amplitude values of two third burst signals recorded on both sides of one of the first burst signals, the amplitude values of the two third burst signals being acquired when the read element is positioned at a middle portion of a track defined by centers of the two third burst signals in a circumferential direction; and
    adjusting a write position of the second burst signal based on the offset.

8. The method according to claim 7, further comprising adjusting the offset according to a position of the read element in a radial direction of the disk.

9. The method according to claim 7, wherein the adjusting the offset adjusts the offset so that a first value is equal to a second value, the first value of one of the amplitude values of the two of the third burst signals coinciding with an amplitude of a fourth burst signal recorded between the two of the third burst signals, the second value of another of the amplitude values of the two of the third burst signals coinciding with the amplitude of the fourth burst signal.

10. The method according to claim 7, wherein the detecting the plurality of first burst signals uses an average of the amplitude values of the plurality of first burst signals corresponding in number to a multiple of sectors of the disk.

11. The method according to claim 7, wherein the detecting the plurality of first burst signals detects, as a new first burst signal, one of the two of the third burst signals that is recorded by the write element in an outer side in the radial direction from the read element.

12. The method according to claim 7, further comprising setting, as the offset, a value obtained by performing integral processing on amplitude values of the two of the third burst signals.

13. A magnetic disk apparatus, comprising:
the servo write control apparatus according to claim 1; and
a head including the read element and the write element.

* * * * *